(12) United States Patent
Stepanian et al.

(10) Patent No.: US 8,307,604 B2
(45) Date of Patent: Nov. 13, 2012

(54) UNDERGROUND UTILITY VAULT REPLACEMENT SYSTEM

(75) Inventors: Aram Stepanian, Henderson, NV (US); Vahe Karamardian, Newport Coast, CA (US)

(73) Assignee: Voltek International, Inc., Newport Coast, CA (US)

( * ) Notice: Subject to any disclaimer, the term of this patent is extended or adjusted under 35 U.S.C. 154(b) by 49 days.

(21) Appl. No.: 12/869,331

(22) Filed: Aug. 26, 2010

(65) Prior Publication Data

US 2011/0047897 A1 Mar. 3, 2011

Related U.S. Application Data

(60) Provisional application No. 61/275,402, filed on Aug. 27, 2009.

(51) Int. Cl.
*E02D 27/00* (2006.01)
*E04B 1/00* (2006.01)
(52) U.S. Cl. .......... 52/745.02; 52/169.6; 52/169.1; 52/169.2; 52/169.14
(58) Field of Classification Search .......... 52/169.6, 52/745.02, 588.1, 169.1, 169.2, 169.11, 169.14
See application file for complete search history.

(56) References Cited

U.S. PATENT DOCUMENTS

| 4,099,353 | A | * | 7/1978 | Blunt | 52/139 |
|---|---|---|---|---|---|
| 4,388,874 | A | * | 6/1983 | Stone | 109/79 |
| 4,559,881 | A | * | 12/1985 | Lankard et al. | 109/83 |
| 5,207,038 | A | * | 5/1993 | Negri | 52/169.6 |
| 5,386,788 | A | * | 2/1995 | Linker et al. | 109/58 |
| 5,454,544 | A | * | 10/1995 | Del Zotto | 249/83 |
| 5,542,780 | A | * | 8/1996 | Kourgli | 405/55 |
| 5,769,109 | A | * | 6/1998 | Stanton et al. | 137/264 |
| 5,778,608 | A | * | 7/1998 | Elliott, Jr. | 52/79.9 |
| 6,196,761 | B1 | * | 3/2001 | Stanton et al. | 405/53 |
| 6,243,997 | B1 | * | 6/2001 | Sannipoli | 52/128 |
| 6,543,371 | B1 | * | 4/2003 | Gardner | 109/83 |
| 6,637,976 | B2 | * | 10/2003 | Stanton | 405/53 |
| 2002/0064425 | A1 | * | 5/2002 | Stanton | 405/53 |
| 2008/0172954 | A1 | * | 7/2008 | Cravens | 52/169.6 |
| 2008/0307729 | A1 | * | 12/2008 | Maimon et al. | 52/332 |
| 2009/0255868 | A1 | * | 10/2009 | Allen et al. | 210/602 |
| 2010/0282136 | A1 | * | 11/2010 | Stanley | 109/64 |

\* cited by examiner

*Primary Examiner* — Mark Wendell
(74) *Attorney, Agent, or Firm* — Stetina Brunda Garred & Brucker

(57) ABSTRACT

An underground utility vault replacement method and system which create an inner structural envelope is shown to protect workers and equipment. It restores structural integrity and safety to the area within a decaying underground vault, without major disruptions above and/or below the ground. The system includes a plurality of structural walls, ceiling panels and structural beams and floor track. All structural elements are sized in width/height/thickness and methodically inserted through the existing manhole and maneuvered in place. Wall panels are attached to the floor by way of a secure track. Wall and ceiling panels are connected by way of a tongue and groove connection and an adhesive.

6 Claims, 21 Drawing Sheets

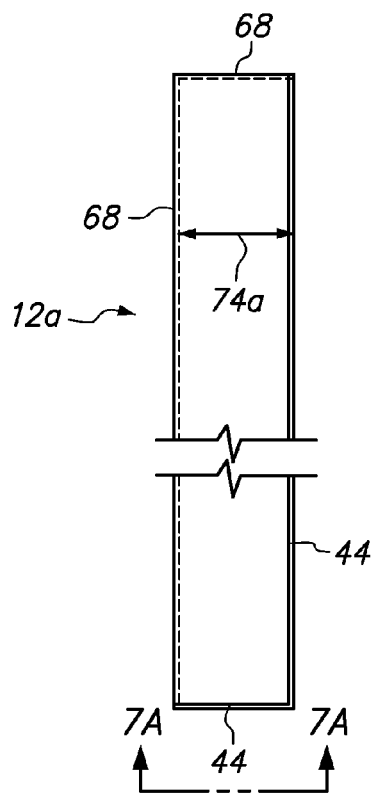
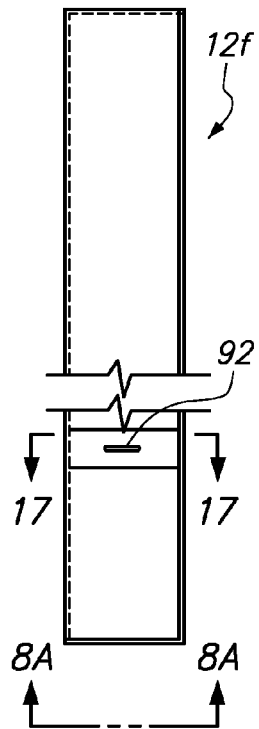
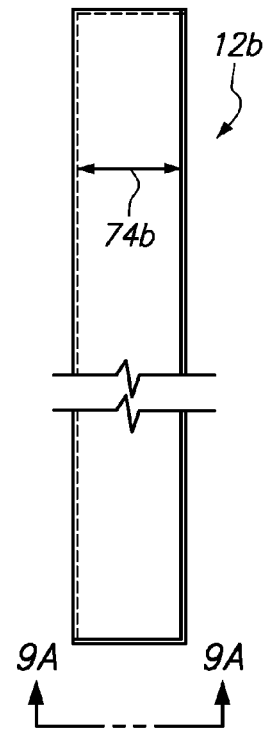
FIG. 7    FIG. 8    FIG. 9
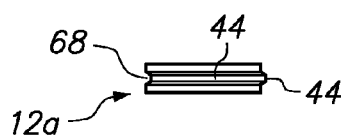
FIG. 7A    FIG. 8A    FIG. 9A

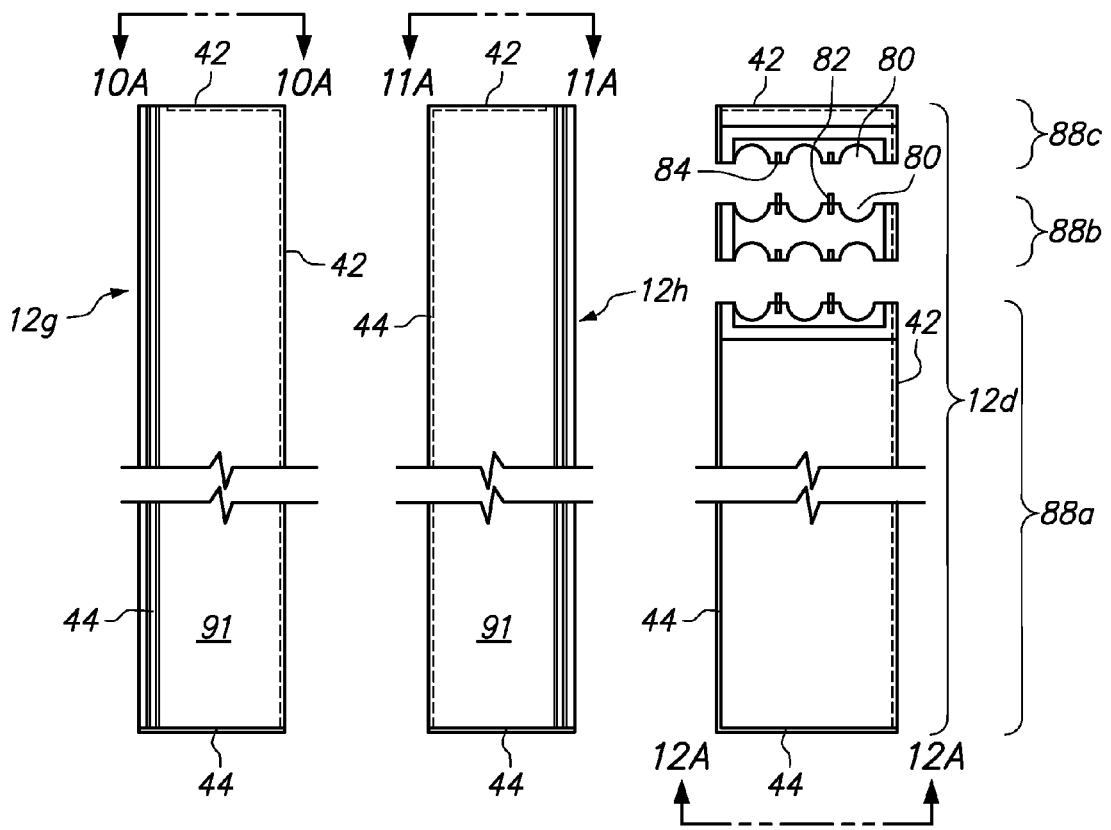
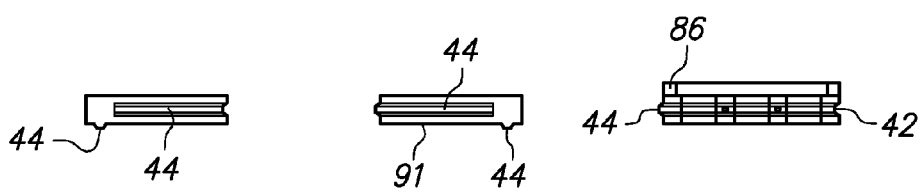
FIG. 10    FIG. 11    FIG. 12
FIG. 10A    FIG. 11A    FIG. 12A

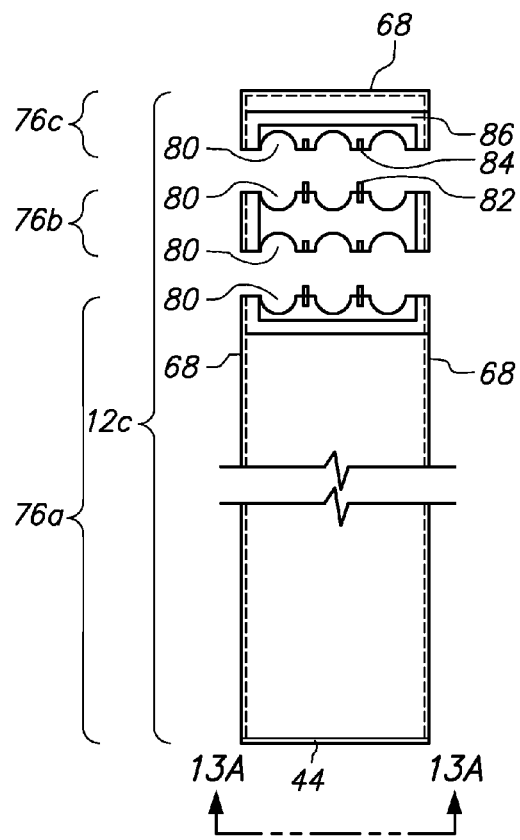
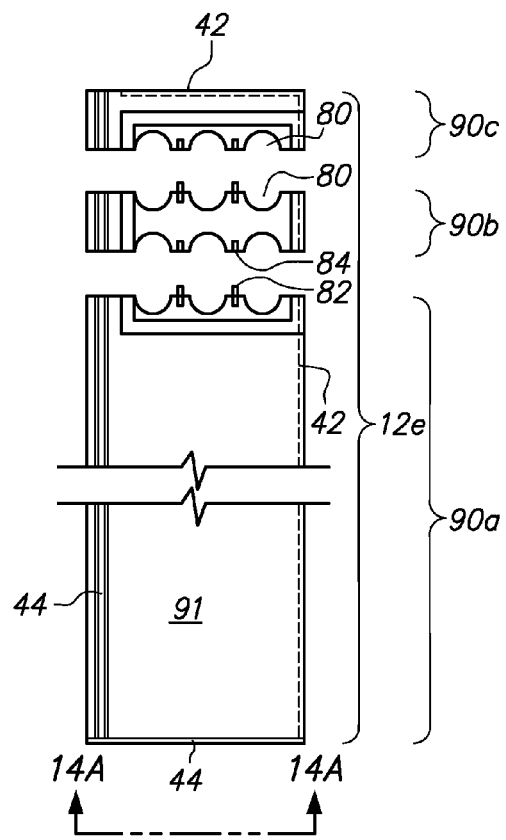
FIG. 13    FIG. 14
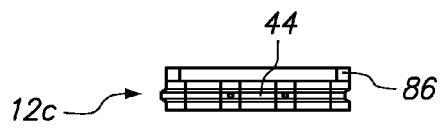
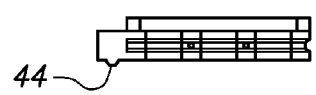
FIG. 13A    FIG. 14A

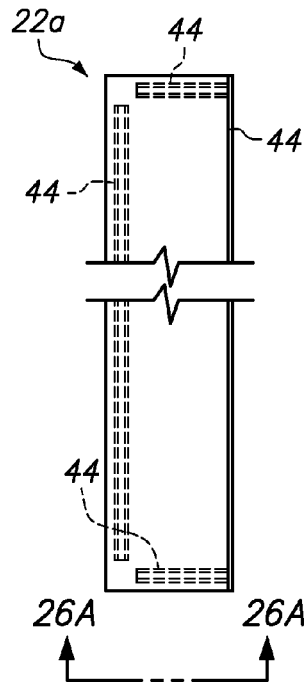
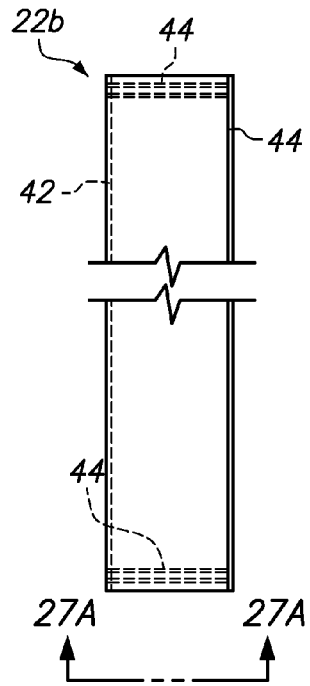
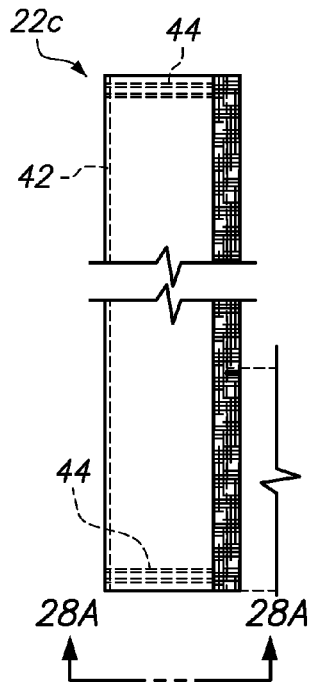
FIG. 24   FIG. 25   FIG. 26
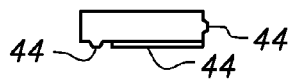
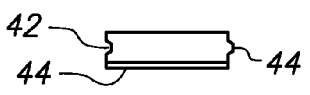
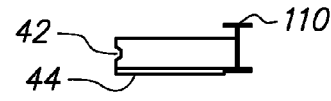
FIG. 24A   FIG. 25A   FIG. 26A
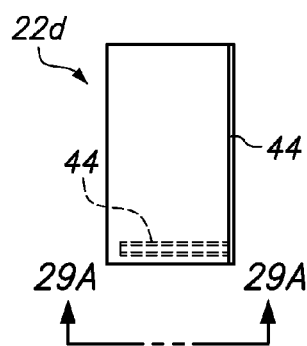
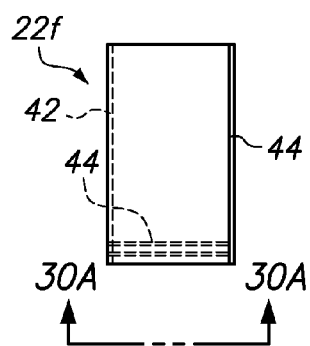
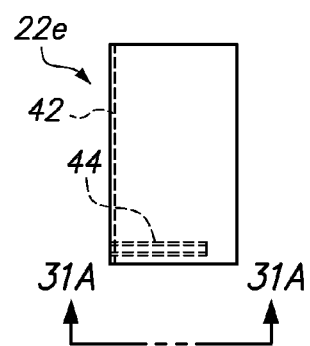
FIG. 27   FIG. 28   FIG. 29
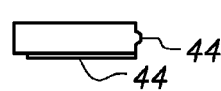
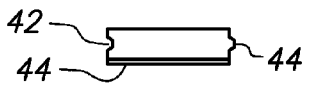
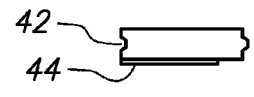
FIG. 27A   FIG. 28A   FIG. 29A

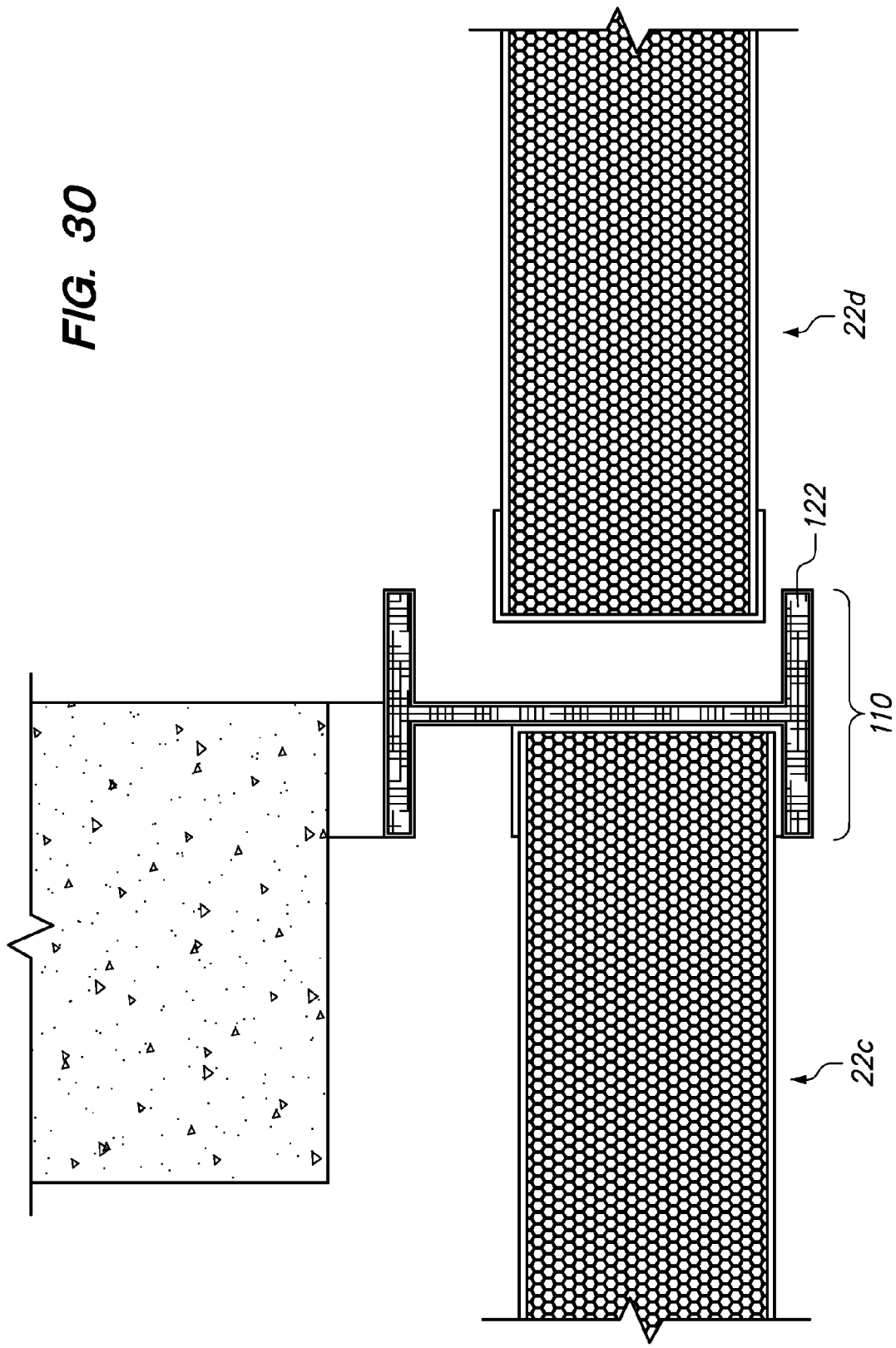

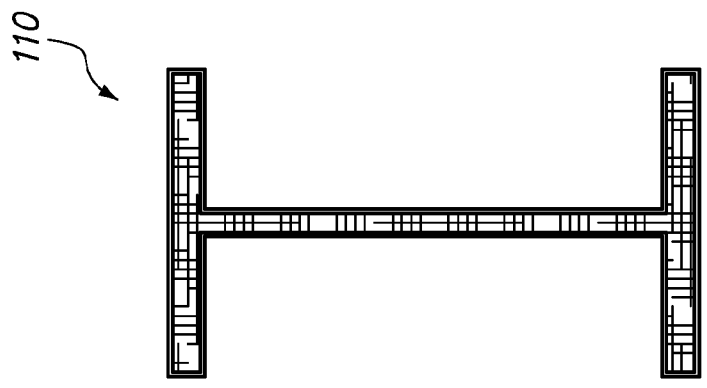
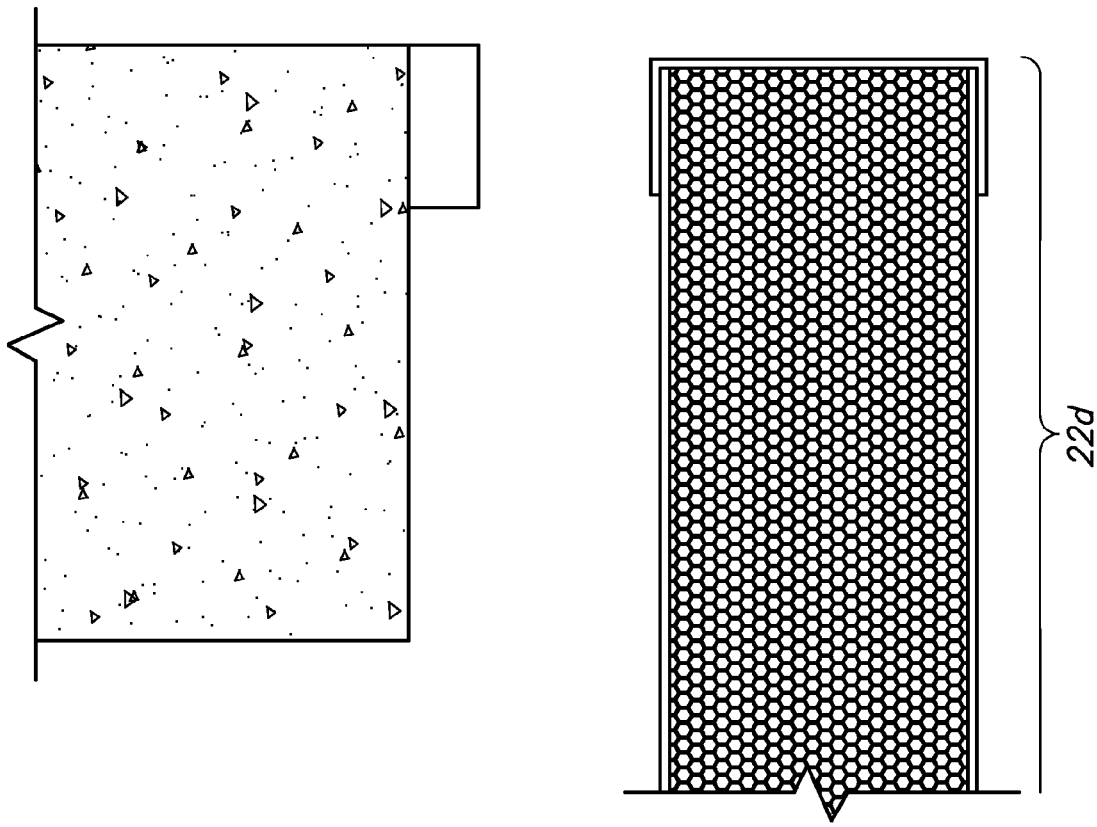
FIG. 31

UNDERGROUND UTILITY VAULT REPLACEMENT SYSTEM

CROSS-REFERENCE TO RELATED APPLICATIONS

This application claims priority to U.S. Prov. Pat. App. Ser. No. 61/275,402, filed Aug. 27, 2009, the entire contents of which is expressly incorporated herein by reference.

STATEMENT RE: FEDERALLY SPONSORED RESEARCH/DEVELOPMENT

Not Applicable

BACKGROUND

The present invention relates to a method and a system for replacing a deteriorating underground vault.

Utility distribution planners, city planners and the like typically develop a system for collecting, distributing and discharging vital elements to the residents of the city. By way of example and not limitation, electrical lines may be routed to a central location such as an electrical vault and distributed to the residents of the city from the central location. These vaults provide space in which the electrical lines would converge and controlling devices adjust the distribution of electrical flow out to the residents. When electricity was made available for mass consumption in a highly dense population, above ground power lines would crowd the skyline of the city. Accordingly, the electrical lines were routed to an electrical vault underground and rerouted through underground trenches. These underground vaults are fabricated from various materials such as hardwood, brick, reinforced concrete and polymers. Over a period of time, the materials degrade and deteriorate, creating an unsafe environment for workers and equipment alike, so that all currently existing underground vaults would eventually need to be replaced. The cost and inconvenience of replacement of these underground vaults are very expensive and onerous compared to their initial cost to purchase and install. One of the reasons is that the electrical supply may need to be interrupted so that residents of the city may be without electricity for a period of time during replacement. Additionally, the underground vault may have to be excavated thereby interrupting traffic flow and other public services. Moreover, some locations may be deemed unsafe and may have to be relocated when replaced. Unfortunately, other suitable locations may not be available due to existing easements, encroachments on other utility suppliers and potential legal implications, thereby further increasing the cost of replacement.

Accordingly, there is a need in the art for addressing the issues of deteriorating underground utility vaults.

BRIEF SUMMARY

The underground utility vault replacement system disclosed herein addresses the needs discussed above, discussed below and those that are known in the art.

The underground utility vault replacement system replaces deteriorating existing underground vaults to restore the once safe environment to their inner space. The system may include a plurality of wall panels and ceiling panels and other components that are narrow enough so that they can be brought into the deteriorating underground vault through an existing manhole and reassembled to replace the deteriorating underground vault. The wall and ceiling panels are small and light enough for an installer to maneuver the panels within the space of the deteriorating underground vault and assemble the panels to form the replacement underground vault within the deteriorating underground vault. The wall and ceiling panels are also strong enough so that the replacement underground vault is built to the recommended structural parameters of the pertinent agency such as AASHTO H20-44.

Tracks are secured to the floor of the existing underground vault. The wall panels are secured to the track and also laid adjacent or secured to each other to form a wall interior to the existing underground vault. A gap is created between the existing wall of the underground vault as well as the plurality of wall panels that form a new wall of the underground utility vault replacement system to not interfere with the existing deteriorating underground vault. A carry beam pattern is laid on top of the plurality of wall panels alongside a plurality of ceiling panels. The wall panels and the ceiling panels are interlocked to each other by way of a tongue and groove connection and by an adhesive. A gap is also formed between the ceiling panels and the ceiling of the existing underground vault. Filler material may be introduced within the gap between the wall panels and the wall as well as the ceiling panels and the ceiling to prevent the walls and ceiling of the deteriorating underground vault from falling down upon the wall and ceiling panels. Accordingly, the existing underground vault does not need to be excavated. The electricity and surrounding traffic does not need to be interrupted for extended periods of time in order to restore the inner space safety of the deteriorating underground vault.

The wall panels and ceiling panels are structural components. The filler materials are not part of the structural components but merely prevent the deteriorating walls and ceilings from falling down onto the replacement underground vault.

More particularly, an underground vault replacement method and system for replacing a deteriorating underground vault is disclosed. The system may comprise a plurality of interlocking wall panels, a plurality of interlocking ceiling panels and a plurality of structural beams. The plurality of interlocking wall panels forms an enclosed wall within the deteriorating underground vault. The plurality of interlocking ceiling panels and the plurality of structural beams are interlockable to an upper portion of the plurality of interlocking wall panels. Each of the interlocking wall and ceiling panels may be narrower compared to a manhole of the deteriorating underground vault so as to be capable of being brought through the manhole and into the deteriorating underground vault for subsequent assembly.

The adjacent wall panels of the plurality of interlocking wall panels may be interlocked with each other by way of interlocking tongues and grooves. Likewise, the adjacent ceiling panels of the plurality of interlocking ceiling panels may be interlocked with each other by way of interlocking tongues and grooves. Moreover, the wall panels are interlockable with the ceiling panels by way of a tongue and groove connection. More particularly, the wall panels may have a groove and the ceiling panels have a tongue that interlocks with the groove of the wall panels.

The system may further comprise a filler material disposable between the ceiling panels and a ceiling of the deteriorating underground vault to prevent the deteriorating underground vault from falling down on the wall and ceiling panels and mitigate formation of a sinkhole situation above the deteriorating underground vault if the ceiling of the deteriorating underground vault deteriorates further. Also, the filler material may be disposed between the wall panels and a wall of the deteriorating underground vault to prevent the deteriorating underground vault from falling down on the wall and ceiling panels and mitigate formation of a sinkhole situation above the deteriorating underground vault should the wall of the deteriorating underground vault deteriorates further.

The system may further comprise one or more tracks securable to a floor of the deteriorating underground utility vault. The tracks have sidewalls that are spread apart so that the wall panels can snugly fit between the sidewalls.

Additionally, a method of replacing a deteriorating underground vault is disclosed. The method may comprise the steps of a) forming a plurality of interlockable structural wall panels and structural ceiling panels, the structural wall panels and structural ceiling panels being sufficiently narrow to permit entry of the structural wall panels and structural ceiling panels through an existing entry (e.g., manhole) of the deteriorating underground vault; b) inserting the formed structural wall panels and the structural or ceiling panels into the deteriorating underground vault through the existing entry (e.g., manhole) of the deteriorating underground vault; c) securing the inserted structural wall panels to a floor of the deteriorating underground vault; d) securing the ceiling panels to the wall panels secured to the ground of the deteriorating underground vault; and e) repeating steps b) and d) until all of the structural wall and ceiling panels are in place within the deteriorating underground vault. Step c may include the step of anchoring wall panel tracks to the floor of the existing underground vault. The wall panels are inserted into the tracks to secure the wall panels to the floor of the existing underground vault. Similarly, the wall panels secured to the floor may refer to the wall panels secured to the floor by way of the tracks.

The method may further comprise the step of filling a gap between a wall of the deteriorating underground vault and the wall panels and between a ceiling of the deteriorating underground vault and the ceiling panels with a filler material to prevent the deteriorating underground vault from falling down on the wall and ceiling panels.

The securing the wall panels step may include the step of securing the wall panels sequentially so that the subsequent wall panel secured to the floor is immediately adjacent to previously secured wall panels.

The method may also further comprise the step of disposing the wall panels gapped away from the wall of the deteriorating underground vault for subsequent filling with a suitable material.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 is a front view of an embodiment of a wall panel;

FIG. 7A is a bottom view of the wall panel shown in FIG. 7;

FIG. 8 is a front view of a further embodiment of the wall panel;

FIG. 8A is a bottom view of the wall panel shown in FIG. 8;

FIG. 9 is a further embodiment of the wall panel;

FIG. 9A is a bottom view of the wall panel shown in FIG. 9;

FIG. 10 is a front view of a further embodiment of the wall panel;

FIG. 10A is a top view of the wall panel shown in FIG. 10;

FIG. 11 is a further embodiment of the wall panel;

FIG. 11A is a top view of the wall panel shown in FIG. 11;

FIG. 12 is a further embodiment of the wall panel;

FIG. 12A is a bottom view of the wall panel shown in FIG. 12;

FIG. 13 is a further embodiment of the wall panel;

FIG. 13A is a bottom view of the wall panel shown in FIG. 13;

FIG. 14 is a further embodiment of the wall panel;

FIG. 14A is a bottom view of the wall panel shown in FIG. 14;

FIG. 24 is a top view of an embodiment of a ceiling panel;

FIG. 24A is an elevation view of the ceiling panel shown in FIG. 26;

FIG. 25 is a top view of a further embodiment of a ceiling panel;

FIG. 25A is an elevation view of the ceiling panel shown in FIG. 27;

FIG. 26 is a top view of a further embodiment of the ceiling panel;

FIG. 26A is an elevation view of the ceiling panel shown in FIG. 28;

FIG. 27 is a top view of a further embodiment of the ceiling panel;

FIG. 27A is an elevation view of the ceiling panel shown in FIG. 29;

FIG. 28 is a top view of a further embodiment of the ceiling panel;

FIG. 28A is an elevation view of the ceiling panel shown in FIG. 28;

FIG. 29 is a top view of a further embodiment of the ceiling panel;

FIG. 29A is an elevation view of the ceiling panel shown in FIG. 30;

FIG. 30 is a cross sectional view of the ceiling panel shown in FIG. 5; and

FIG. 31 is a cross sectional view of the ceiling panel shown in FIG. 5.

DETAILED DESCRIPTION

Figure 1:
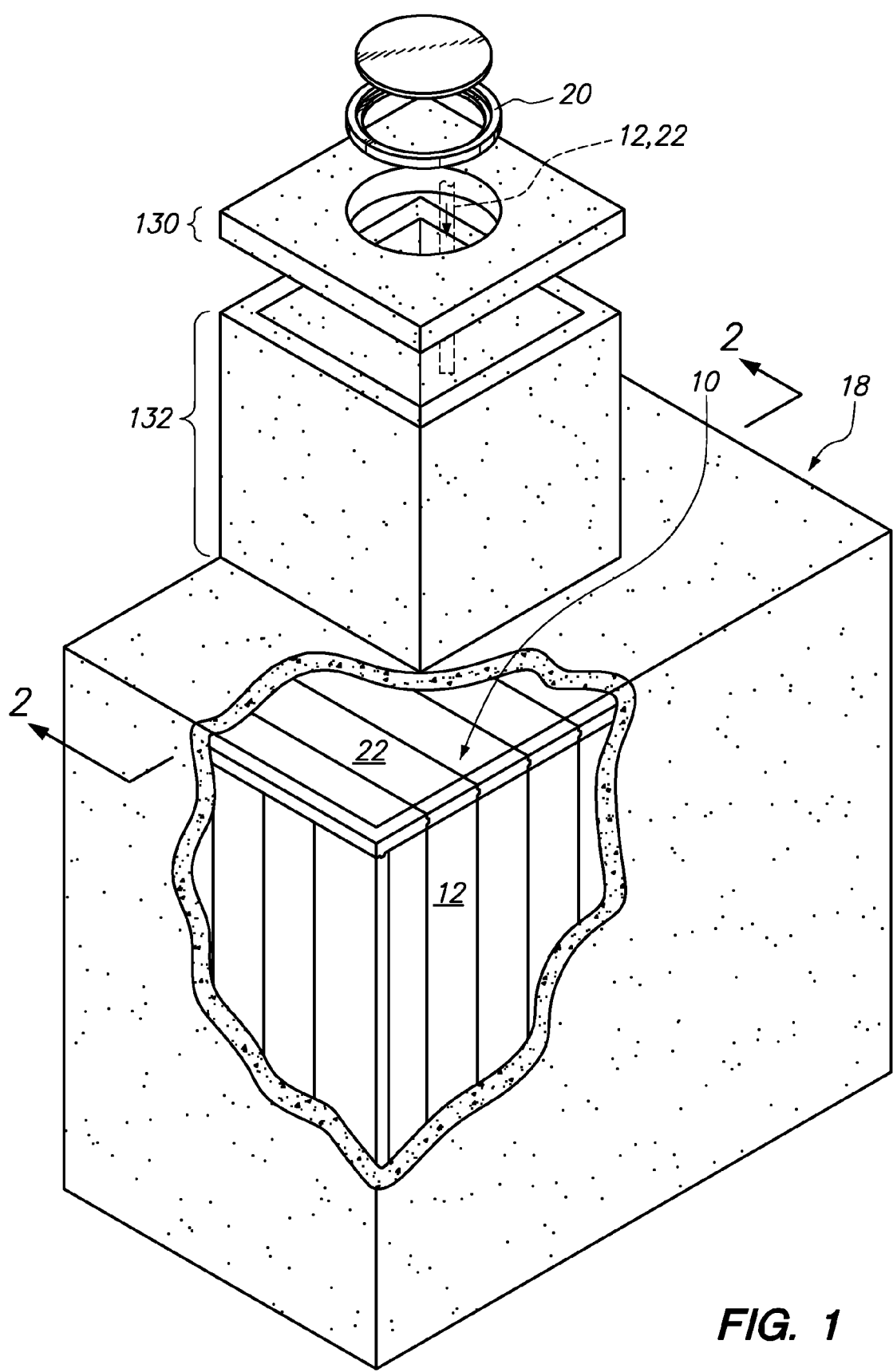
FIG. 1 is a perspective view of an existing underground vault with an underground utility vault replacement system.

Referring now to the drawings, an underground utility vault replacement system 10 is shown which can be used to replace a deteriorating underground vault 18 fabricated of concrete or other material, as shown in FIG. 1. The system 10 comprises a plurality of wall panels 12 secured to the floor 14 by way of tracks 16. The wall panels 12 may be brought into underground utility vault 18 by way of the existing manhole 20 to the existing underground vault 18 to minimize disruption to the residents. Additionally, ceiling panels 22 may be brought into the underground utility vault 18 through the existing manholes 20 and laid on top of the wall panels 12 and secured to the wall panels 12. Wall panels 12 and ceiling panels 22 may be narrow enough to be brought into the existing underground vault 18 through the existing manhole 20. A gap 24 may be left between the wall panels 12 and the wall 26 when assembling the wall panels 12 so that the existing underground vault does not interfere with the underground vault installation. The gap 24 may be filled with a filler material 28 to prevent the deteriorating underground vault from falling down onto the wall and ceiling panels. Additionally, a gap 30 may be left between the ceiling panels 22 and a ceiling 32 of the underground utility vault 18 so that the replacement underground vault does not interfere with the existing underground vault. Similarly, the gap 30 may be filled with the filler material 28 to prevent the deteriorating underground vault from falling down onto the wall and ceiling panels. The wall panels 12 and ceiling panels 22 may be strong enough so that the replacement underground vault is built to recommend structural parameters of the pertinent agency such as AASHTO H20-44. Accordingly, the underground utility vault replacement system 10 provides a way to replace the existing underground utility vault and build a new underground vault 18 to current industrial specification without extended utility disruptions or extensive tear down and rebuild of the existing underground utility vault 18 as well as other legal and physical issues.

Figure 2:
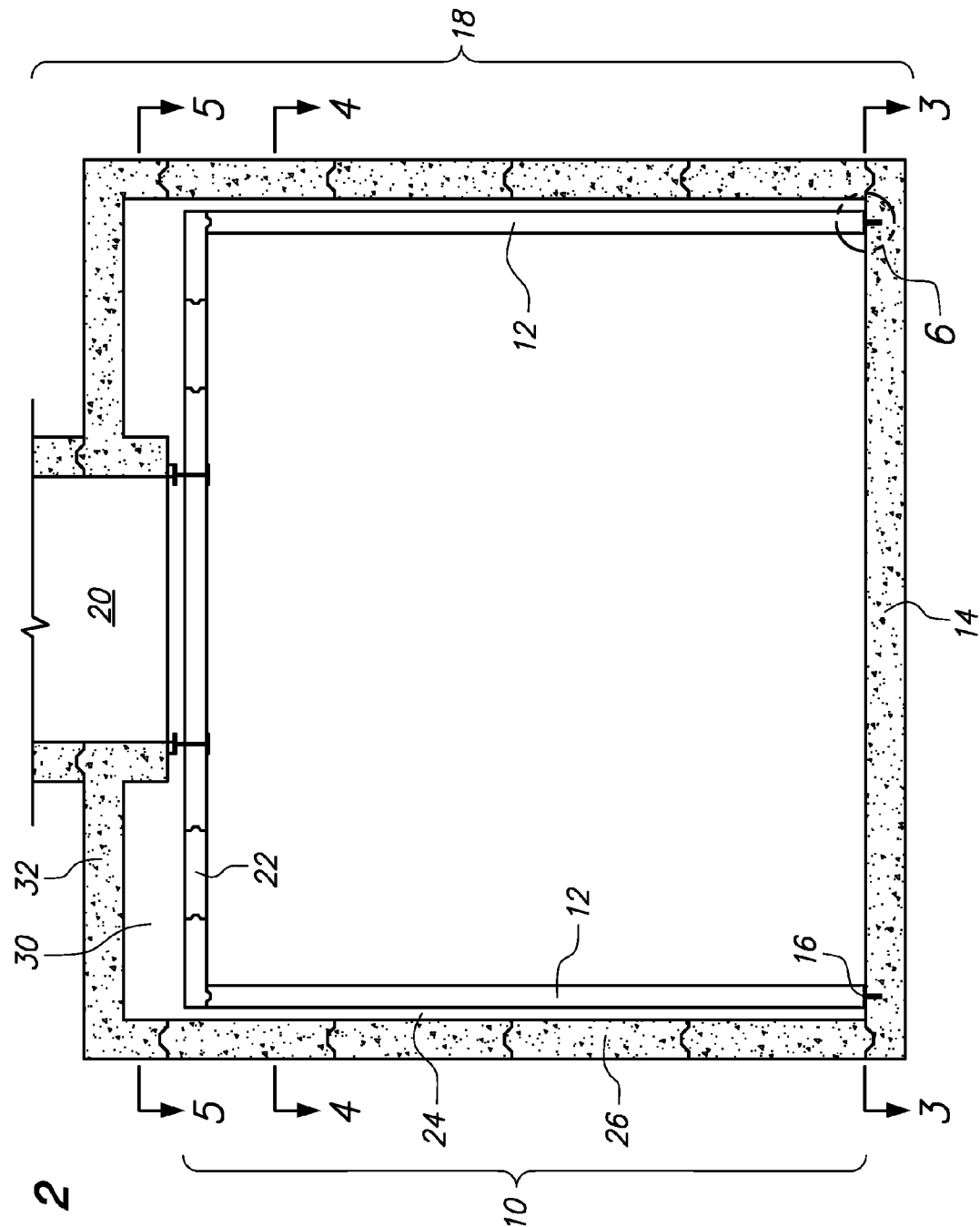
FIG. 2 is a cross sectional view of the underground vault shown in FIG. 1.
Figure 3:
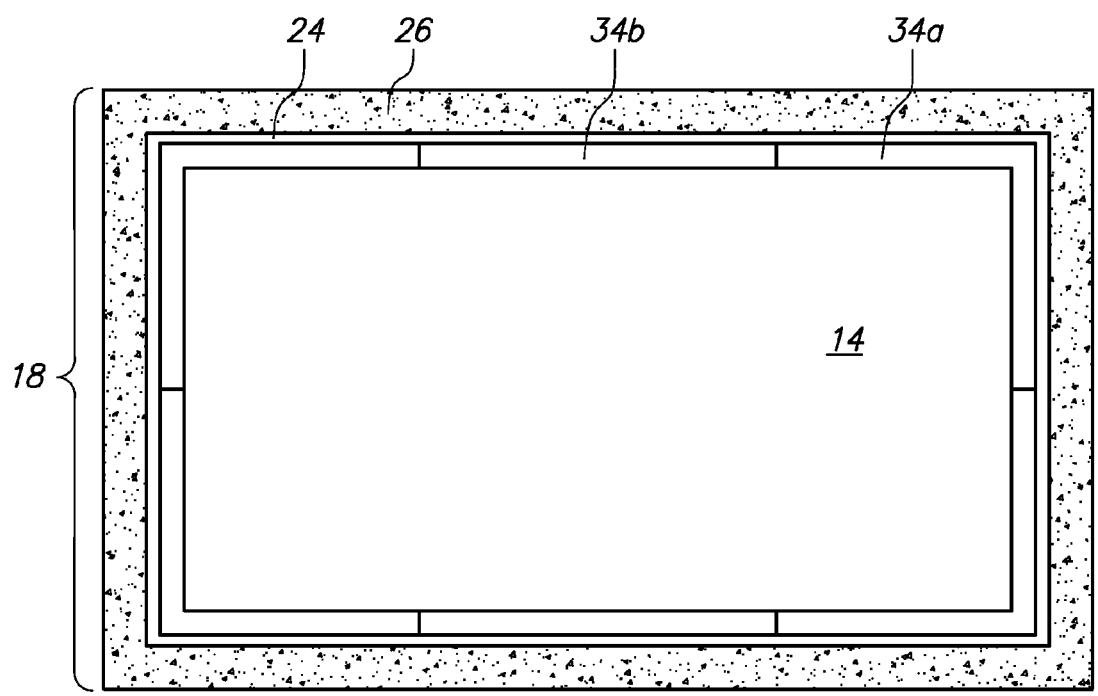
FIG. 3 is a cross sectional view of the underground vault shown in FIG. 2.
Figure 4:
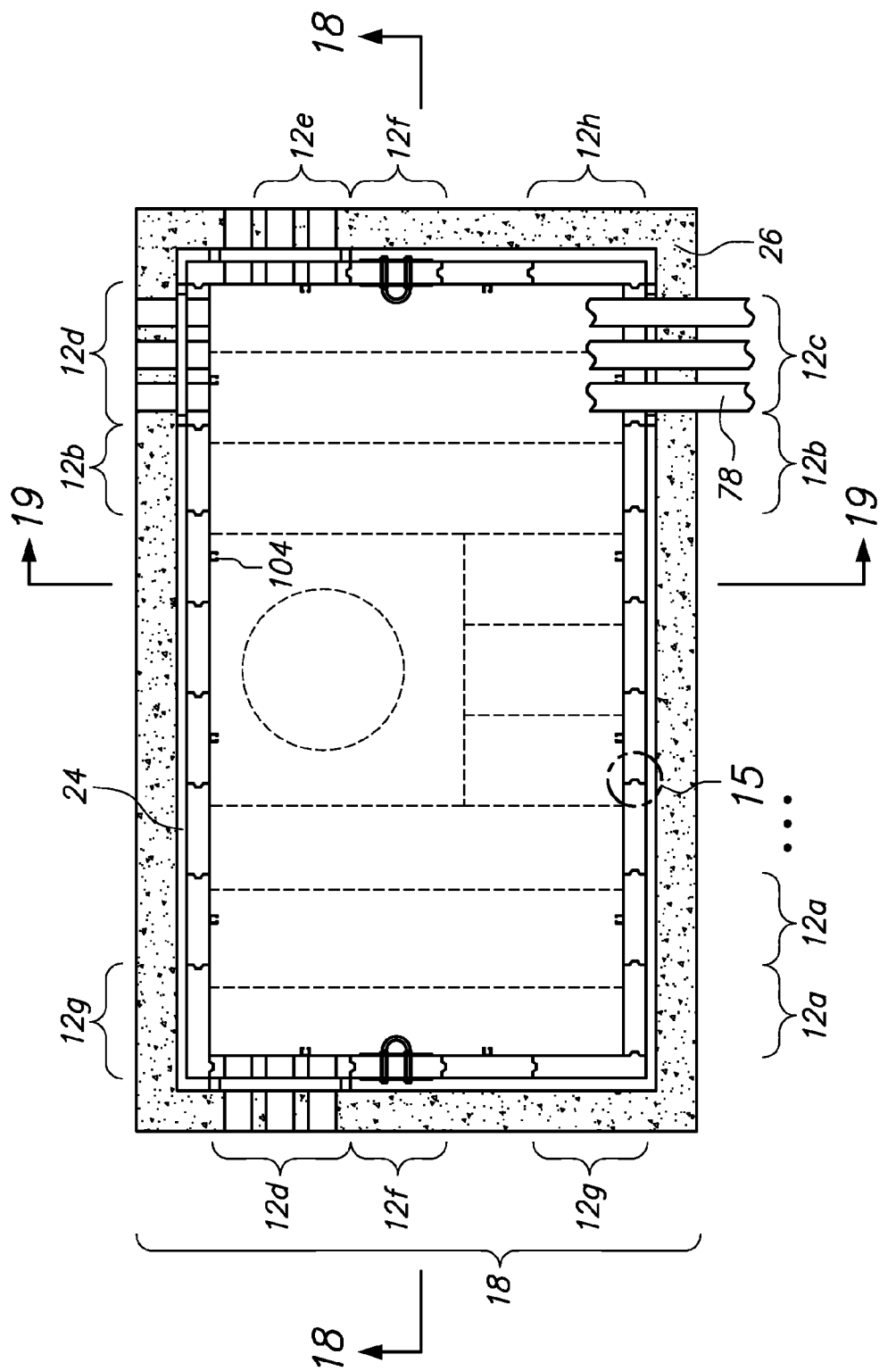
FIG. 4 is a cross sectional view of the underground vault shown in FIG. 2 at a different elevation.
Figure 5:
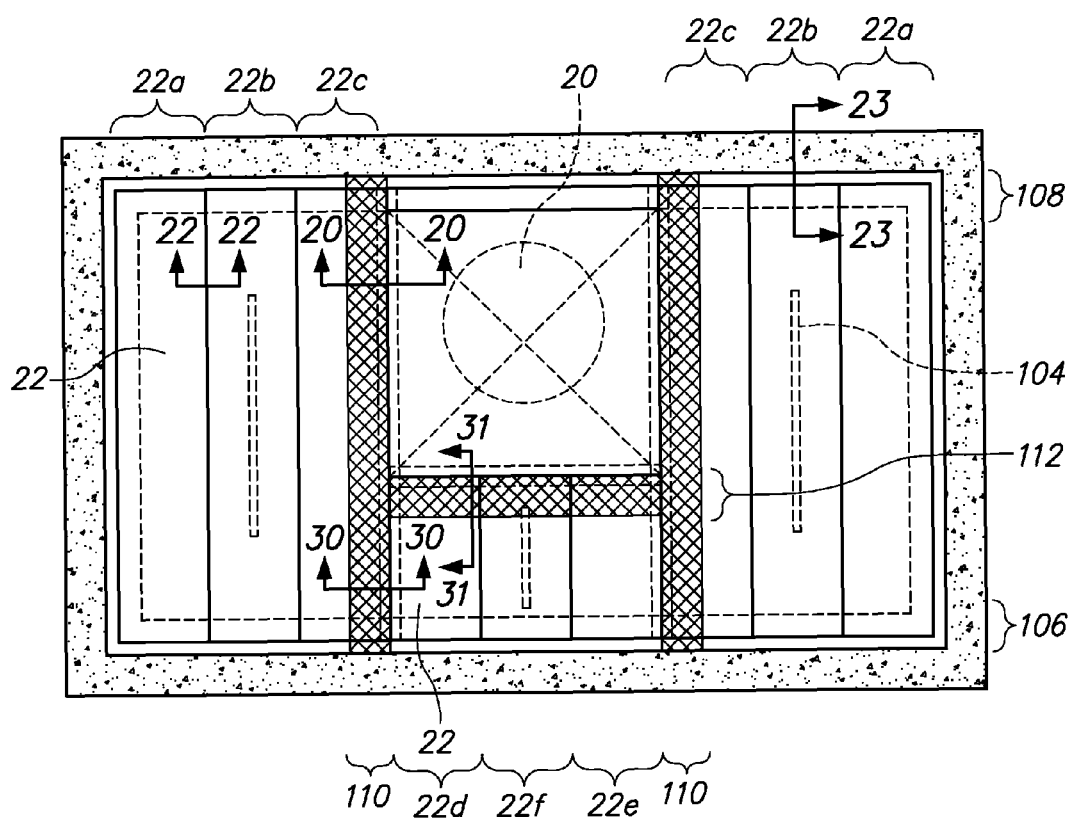
FIG. 5 is a cross sectional view of the underground vault shown in FIG. 2 at a further different elevation.
Figure 6:
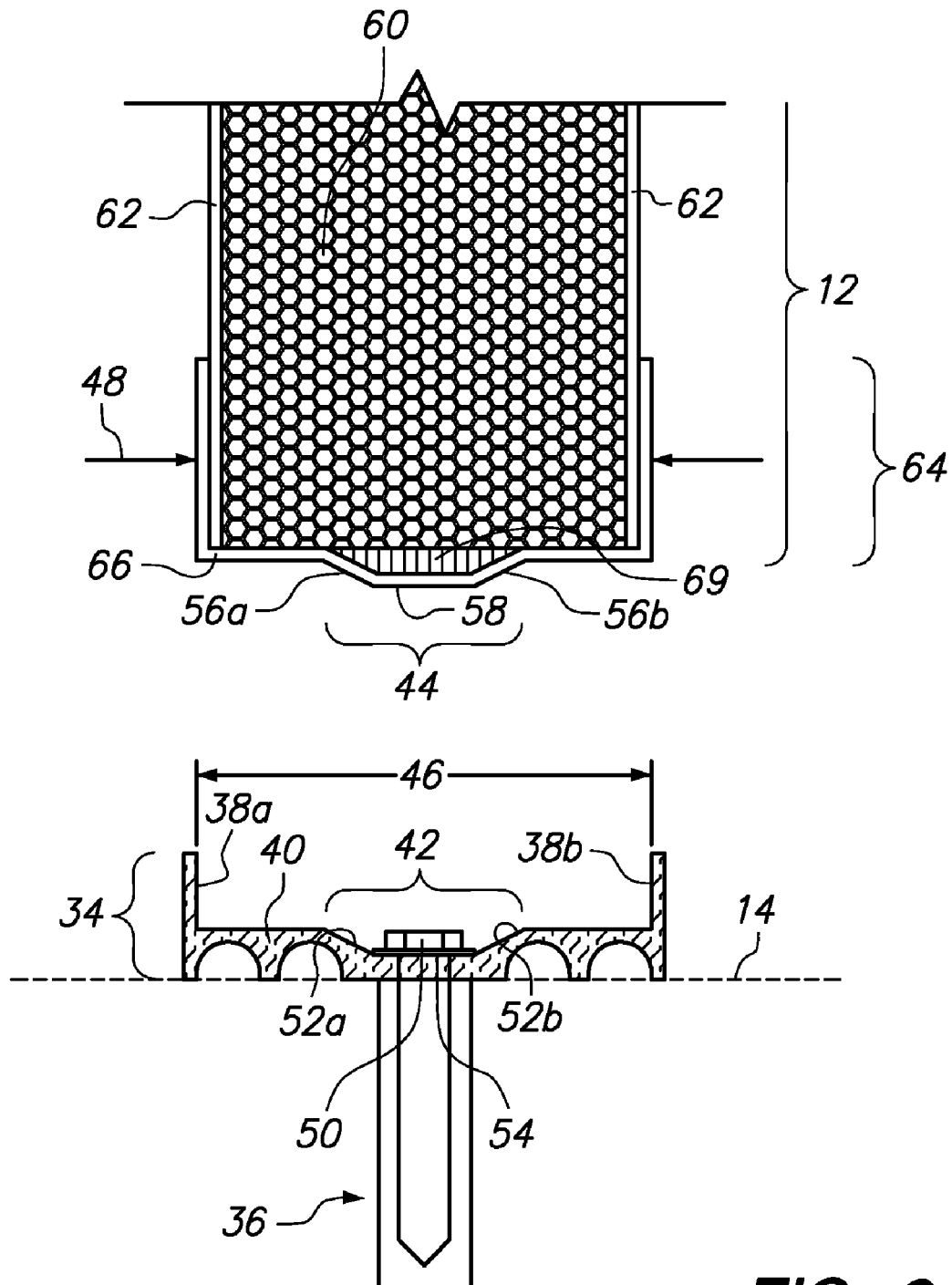
FIG. 6 is a cross sectional view of a wall panel and a track securable to a floor of the underground vault.

Referring now to FIG. 2, a cross sectional view of the underground utility vault 18 with the underground utility vault replacement system 10 assembled therein is shown. FIGS. 3-5 illustrate three (3) different elevations within the underground utility vault 18 as indicated in FIG. 2. At the ground level shown in FIG. 3, a track 34 may be secured to the floor 14. A cross sectional view of the track 34 and wall panel 12 are shown in FIG. 6, as indicated in FIG. 2. The track 34 may be secured to the floor 14 by way of fasteners 36. The track 34 may have two (2) sidewalls 38a, b that are generally perpendicular to the floor 14 and also to a base plate 40. The base plate 40 may have a groove 42 which is sized and configured to receive a tongue 44 of the wall panels 12. The distance 46 between the sidewalls 38a, b may be equal to a width 48 of the wall panels 12. The wall panel 12 may be inserted between the sidewalls 38a, b and the tongue 44 received into the groove 42. In this manner, the wall panels 12 do not shift left to right. The head 50 of the fasteners 36 may be disposed within the groove 42. The tongue 44 of the wall panel 12 may have a cut out section that receives the head 50 so that the tongue 44 can mate with the groove 42. More particularly, the groove 42 may have two (2) inclined surfaces 52a, b joined by a flat lower surface 54. The tongue 44 may have corresponding inclined surfaces 56a, b and a flat lower surface 58. When the wall panel 12 is inserted into the track 34, the inclined surfaces 52a, b contact inclined surfaces 56a, b. Additionally, the lower surface 54 contacts the lower surface 58. In this manner, the tongue and groove connection 44, 42 as well as the sidewalls 38a, b limit movement of the wall panels 12. An adhesive may also be laid on the tongue 44 and/or groove 42 to further secure the wall panels 12 together.

The track 34 may be fabricated from an epoxy reinforced glass and carbon fibers or other similar material known in the art or developed in the future. The track 34 may be a pultruded carbon reinforced epoxy part or other similar material known in the art or developed in the future having the cross sectional configuration shown in FIG. 6. It is also contemplated that the track 34 may be fabricated from a non conductive material suitable to secure the wall panels to the floor. One or more holes may be drilled through the lower surface 54 to receive the fasteners 36 which secure the track 34 to the floor 14 of the underground utility vault 18.

Still referring to FIG. 6, the wall panels 12 may have an aluminum honeycomb core 60. The aluminum honeycomb core 60 may be encased within a structural composite skin 62a, b which covers the interior and exterior sides of the wall panels 12. A lower distal end portion 64 of the wall panel 12 may have a formed shaped 66 that covers the distal end of the wall panel 12 and overlaps the structural composite skin 62. The formed shape 66 defines the tongue 44. A filler material such as Bolsa structural filler 69 or other similar product may be disposed between the distal end of the wall panels 12 and the formed shape 66 within the recess defined by the tongue 44.

Referring back to FIG. 3, the track 34 may be laid and secured to the floor 14 about an inner perimeter of the wall 26 of the underground utility vault 18. The track 34 may have different configurations. The tracks 34 shown in FIG. 3 have a corner track 34a as well as straight connecting tracks 34b. Other types of tracks 34 are also contemplated such as Z-shaped, U-shaped, etc. These tracks 34 may be sized and configured to fit the inner perimeter of the underground utility vault 18. The square or rectangularly shaped underground utility vaults 18 shown in the Figures are for illustration purposes and not to limit application of the system to any particular configuration. Accordingly, other shaped underground vaults may be replaced with the utility underground vault replacement system 10 discussed herein. These other types of configurations include circular, oval, triangular, etc. The tracks 34 are gapped away from the wall 26 of the underground utility vault 18. The gap 24 provides for space between the wall panels 12 and the wall 26 of the underground utility vault 18. The deteriorating underground vault does not interfere with the replacement vault installation.

Figure 15:
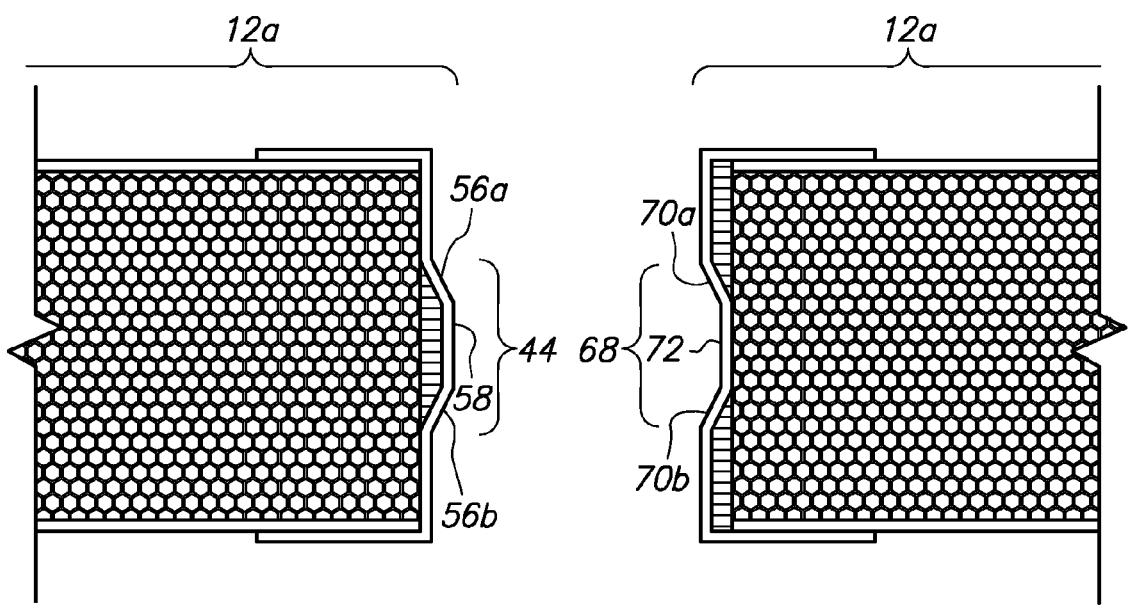
FIG. 15 is a cross sectional view illustrating interconnection between adjacent wall panels with a tongue and groove connection.

Referring now to FIG. 4, the gap 24 is more clearly shown between the wall panels 12 and the wall 26 of the underground utility vault 18. The wall panels 12 may be provided in various configurations as shown in FIGS. 7-14A. The wall panel 12a shown in FIGS. 7 and 7A may have two (2) adjacent sides formed with tongues 44 and two (2) adjacent sides formed with grooves 68. When the wall panel 12a is disposed within the track 34, wall panel 12a may be laid end to end as shown in FIG. 15 so that adjacent tongues 44 and grooves 68 engage each other. The vertical side of the wall panel 12a may have a tongue 44 that fits into a groove 68 on the vertical side of the wall panel 12b. The tongue and grooves 44, 68 may have respective inclined surfaces 56a, b and flat surface 58 that contact inclined surfaces 70a, b and a lower flat surface 72 of the groove 68. The wall panel 12a may have a different size as shown in FIGS. 9, 9A so that the plurality of wall panels 12 may fit snugly within the underground utility vault 18. By way of example and not limitation, a width 74a (see FIG. 7) of the wall panel 12a may be greater than the width 74b (see FIG. 9) of the wall panel 12b. Referring now to FIG. 4, a plurality of wall panels 12a may be laid from left to right. To accommodate different sized underground utility vaults 18, the wall panel 12a may be made of different sizes as shown in FIGS. 7 and 9. The wall panel 12b shown in FIG. 9 may be laid adjacent the wall panel 12a. The wall panels 12 eventually surround the inner perimeter of the underground vault 18.

As the wall panels 12 are erected, the underground utility vault 18 may have various utility lines 78 that come into the underground utility vault 18 through the wall 26. In this instance, wall panel 12c (see FIGS. 13 and 13A) may be inserted into the track 34 adjacent the wall panel 12b. The wall panel 12c may comprise three (3) different components 76a, b, c. The wall panel 12c has a tongue 44 formed at its lower edge. Grooves 68 are formed on the opposed vertical edges as well as the top edge of the wall panel 12c. The wall panel section 76a is inserted into the track 34 and under the pipes 78. Section 76b is inserted between upper and lower pipes 78. Section 76c is laid on top of the upper row of pipes 78. The wall panel 12b shown in FIGS. 9 and 9A may be slightly narrower compared to the wall panel 12a shown in FIGS. 7 and 7A. Moreover, the wall panel sections 76a, b and c may have mating utility apertures 80. When these utility apertures 80 are mated together, they surround the pipes 78. The wall panel sections 76a, b, c may also held together by pins 82. The pins 82 are embedded in adjacent holes 84 formed in adjacent wall panel sections 76a, b and wall panel sections 76b, c. A block filler 86 may be disposed about the utility pipes 78 and about the utility pipe apertures 80. The block filler 86 may be applied at the perimeter of the pipes 78. Additionally, the block filler 86 may be applied on the side facing the decaying underground vault to avoid the filler blocking the unused utility pipes 78. Although only three components 76a, b, and c are shown and described, the wall panel may have two or more components 76a-n depending on the number of existing cable accesses.

Wall panels similar to wall panel 12c may also be used. By way of example and not limitation, wall panels 12d, e are shown in FIGS. 12, 12A, 14 and 14A. Wall panel 12d (see FIGS. 12 and 12A) also has three (3) different sections 88a, b, c. These sections 88a, b, c are installed around utility pipes 78 which are received into utility apertures 80. Adjacent sections 88a, b and 88b, c are held together by pins 82 formed in the sections 88a, b, c and by way of an adhesive. The sections 88a, b, c are also held together by adjacent wall panels 12 since adjacent wall panels 12 are engaged to each other by corresponding tongues and grooves 44, 42. The wall panel 12d also may have grooves 42 and tongues 44 that mate up with adjacent wall panel 12 and ceiling panels 22. The wall panel 12d may additionally have a block filler 86 which may be applied to the wall panel 12d on the side facing the underground decaying vault by way of adhesive, etc.

The wall panel 12e (see FIGS. 14 and 14A) may also be formed of three (3) sections 90a, b, c. The wall panel 12e may have the same structure as that in wall panels 12d and 12c. The grooves 42 are formed on the edges of the wall panel 12e. However, the grooves 42 on the top edge do not extend entirely across the top edge of the wall panel 12e. Additionally, a tongue 44 is formed on the planar side of the wall panel 12e. A groove 44 is also formed on the lower edge of the wall panel 12e. For all wall panels 12, tongues and grooves 44, 42 may be formed in any combination on any of the edges of the wall panel 12 as well as on the planar sides 91 of the wall panel 12. The tongues and grooves 44, 42 may be formed in the same manner as discussed in relation to FIG. 15.

Figure 16:
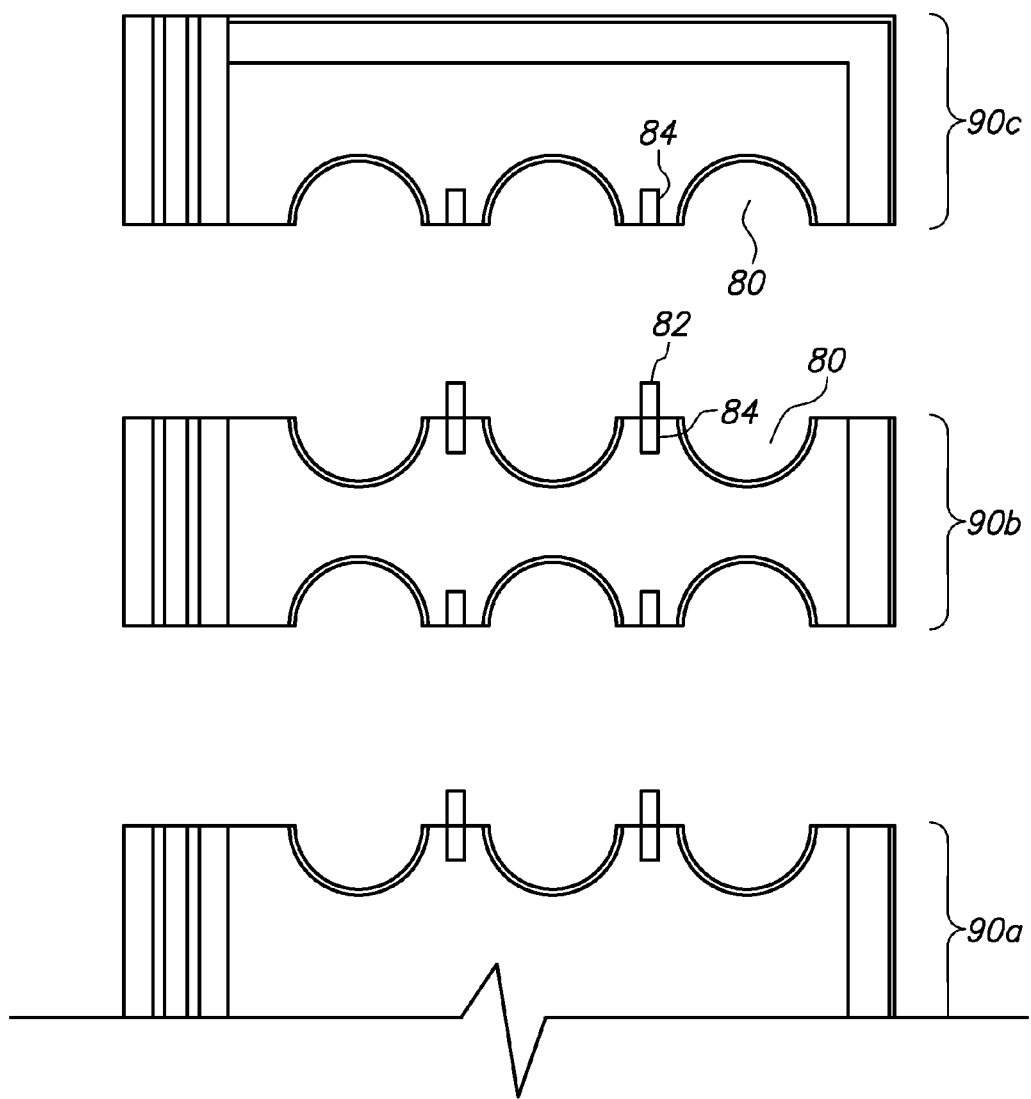
FIG. 16 is an enlarged view of sections of the wall panel shown in FIG. 14.

Referring now to FIG. 16, the panel sections 90a, b, c of the wall panel 12e shown in FIG. 14 are more clearly shown. The pins 82 may initially be embedded within holes 84 formed in one of the panel sections 90a, b, c. When the sections 90a, b, c are stacked upon each other, the pins 82 are embedded within holes 84 of an adjacent panel section 90b, 90c. Any combination of holes and pins 84, 82 are contemplated. The sections 76a, b, c and 88a, b, c may have the same structure.

Figure 17:
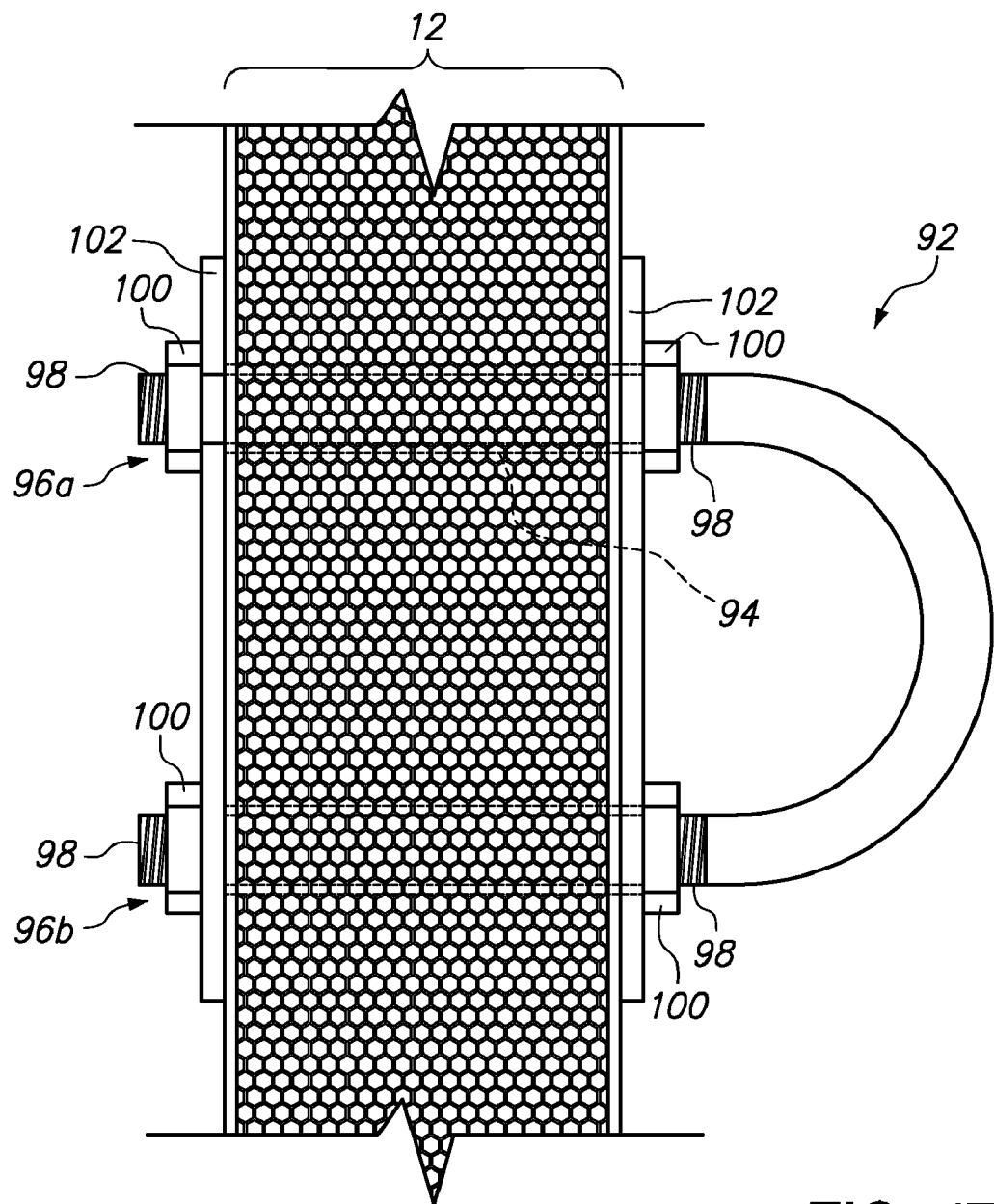
FIG. 17 is a cross sectional view of the wall panel shown in FIG. 8 illustrating a loop.

Referring now to FIGS. 8 and 8A, the wall panel 12f may be similar to the wall panel 12a except that the wall panel 12f has a loop 92 fabricated from a steel rod and allows for a cable pull. Although the loop 92 is mounted to the wall panel 12f, the loop 92 may be mounted to any one of the wall panels discussed herein as well as the ceiling panels 22. Referring now to FIG. 17, the loop 92 may be attached to the wall panel 12 as follows. In particular, apertures 94 may be formed through the wall panel 12. The loop 92 may have a U-shaped configuration with distal end portions 96a, b with threads 98 formed thereon. The threads 98 may engage nuts 100 which are used to clamp down upon the wall panel 12. The nuts 100 bear down upon washer plates 102. The nuts 100 are clamped down to secure the loop 92 to the wall panel 12. As discussed above, the loop 92 may also be secured to the ceiling panels 22 or other wall panels discussed herein.

Referring now to FIGS. 10, 10A, 11 and 11A, the wall panels 12g, h may allow for turning of the wall of the wall panels 12 at a corner, as shown in FIG. 4. The wall panel 12g (see FIGS. 10 and 10A) may have grooves 42 that extend across the vertical edge as well as a portion of the top edge. As can be seen in FIG. 4, the groove 42 of the wall panel 12g mates up with a tongue 44 of an adjacent wall panel 12. The wall panel 12h may have a groove 42 along its top edge and tongue 44 on the planar surface 91 vertical edge as well as bottom edge. As discussed herein, the tongues and grooves 44, 42 may be fabricated or incorporated into the wall panels 12 and ceiling panels 22 along any edge or planar surface 91 of the wall panel 12 or ceiling panel 22. The tongues and grooves 44, 42 are formed so as to mate with adjacent corresponding and mating grooves and tongues 42, 44 of adjacent wall panel 12 or ceiling panel 22.

When erecting the plurality of wall panels 12 in the track 34 (see FIG. 6), adhesive may be applied within the tongue and groove connection 44, 42 to assist in rigidizing the wall panels 12.

Figure 18:
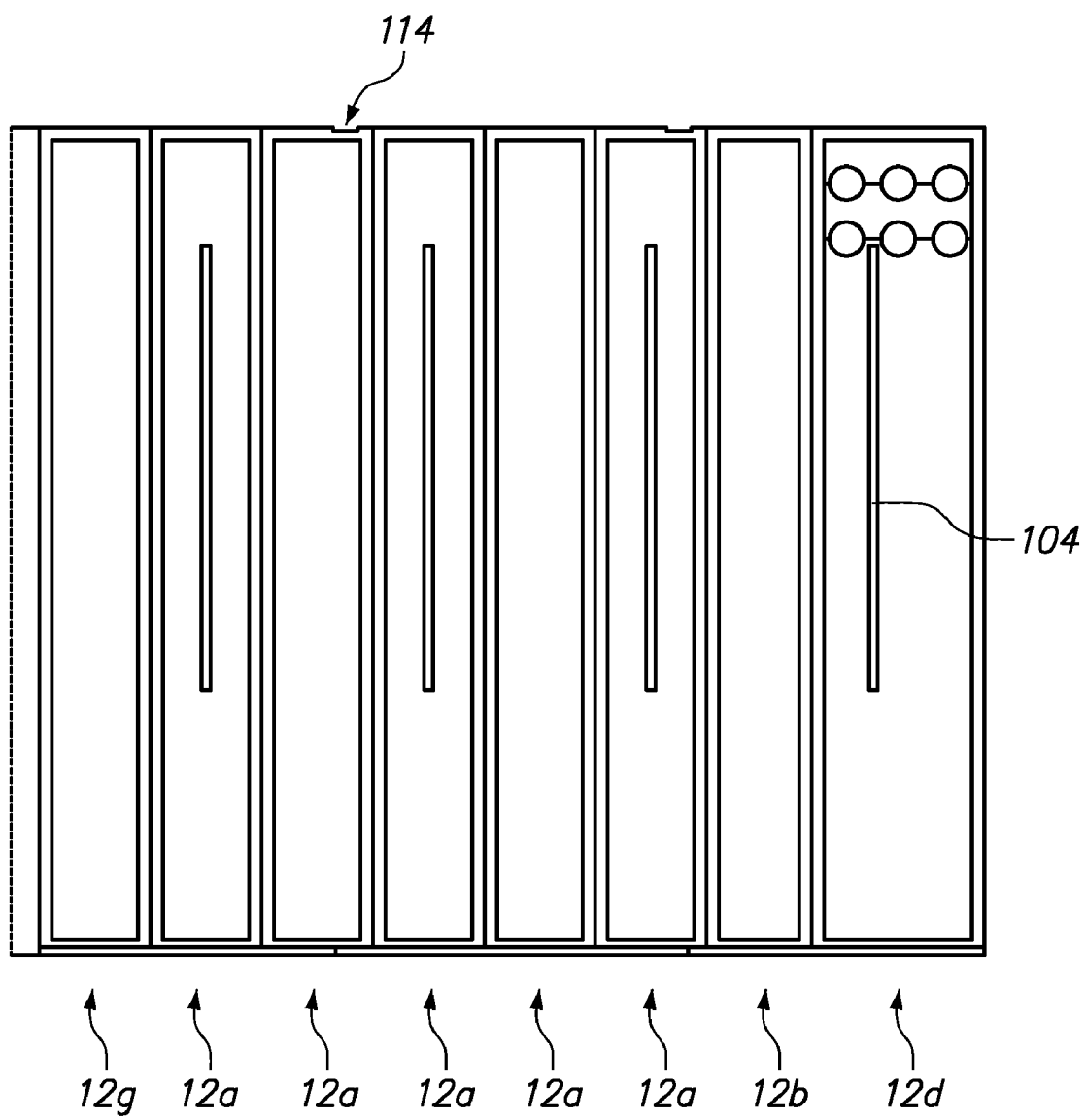
FIG. 18 is a cross sectional view of the underground vault shown in FIG. 4 illustrating a front view of a plurality of wall panels.
Figure 19:
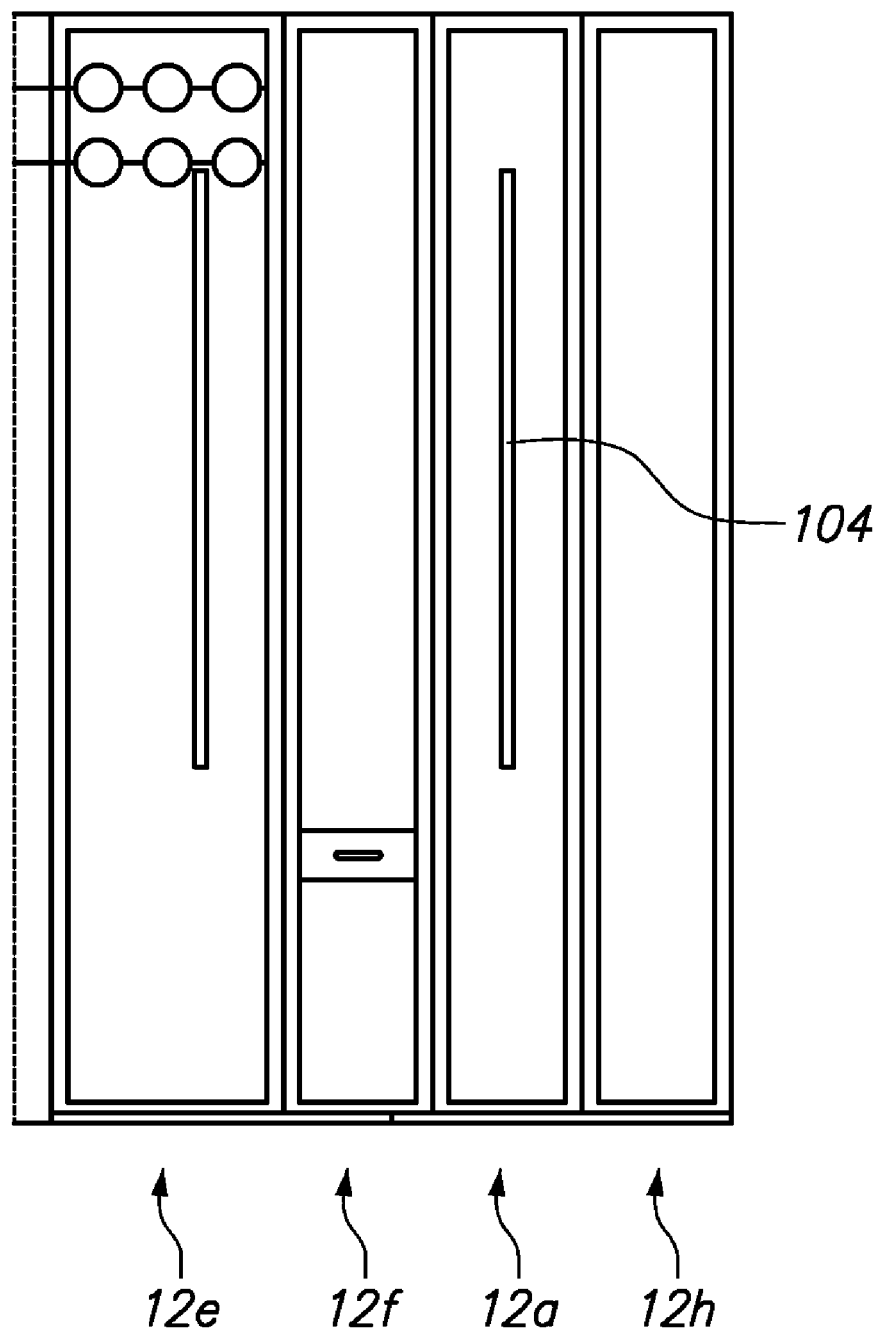
FIG. 19 is a cross sectional view of the underground vault shown in FIG. 4 illustrating a front view of a plurality of wall panels.

After the wall panels 12 are assembled edge to edge, the plurality of wall panels 12 form a solid wall, as shown in FIGS. 18 and 19. One or more struts 104 may be attached to the wall panels 12. The struts 104 may also be attached to one or more ceiling panels 22 or wall panels 12. The struts 104 may have a U shaped configuration with an attachment that allows electrical wires and other objects to be hung from the strut. One example of the strut 104 is a strut manufactured and sold under the tradename UNISTRUT.

After the wall panels 12 are installed into the track 34, the ceiling panels 22 may be assembled upon the top edge of the wall panels 12. As shown in FIG. 5, the ceiling panels 22 may extend from one wall 106 of wall panels 12 to a second wall 108 of a plurality of wall panels 12. To allow for the manhole 20, carry beams 110 may extend from the wall 106 of wall panels 12 to the wall 108 of wall panels 12. A cross carry beam 112 is supported by the carry beams 110. Ceiling panels 22 are supported by the wall panels 12, the carry beam 110, and cross carry beam 112.

To begin installation of the ceiling panels 22, the ceiling panels 22 are brought into the existing underground vault 18 through the manhole 20. The ceiling panels 22 similar to the wall panels 12 are narrow enough so that the ceiling panels 22, wall panels 12, and tracks 34 may be slipped through the manhole 20 without breaking or opening up the manhole 20. As needed, the ceiling panels 22 and carry beams 110, 112 are brought into the existing underground vault 18. The other components disclosed herein may also be narrow enough to be brought in through the existing manhole 20.

Although the wall panels 12, ceiling panels 22 and the other components of the system are fabricated to be narrow enough to be slipped through the manhole, it is also contemplated that in those situations that the wall panels 12 and ceiling panels 22 or other components cannot be fabricated to be sufficiently narrow so as to slip through the man hole, a top cap 130 of a neck 132 of the existing underground vault may be removed. Wall panels 12 and ceiling panels 22 wider than the manhole but narrower than an opening of the neck 132 may be slipped into the deteriorating underground vault through the opening of the neck 132. Even if the top cap 130 is removed, doing so will not cause as much disruption to the surrounding businesses and people compared to total excavation of the deteriorating existing underground vault.

Figure 20:
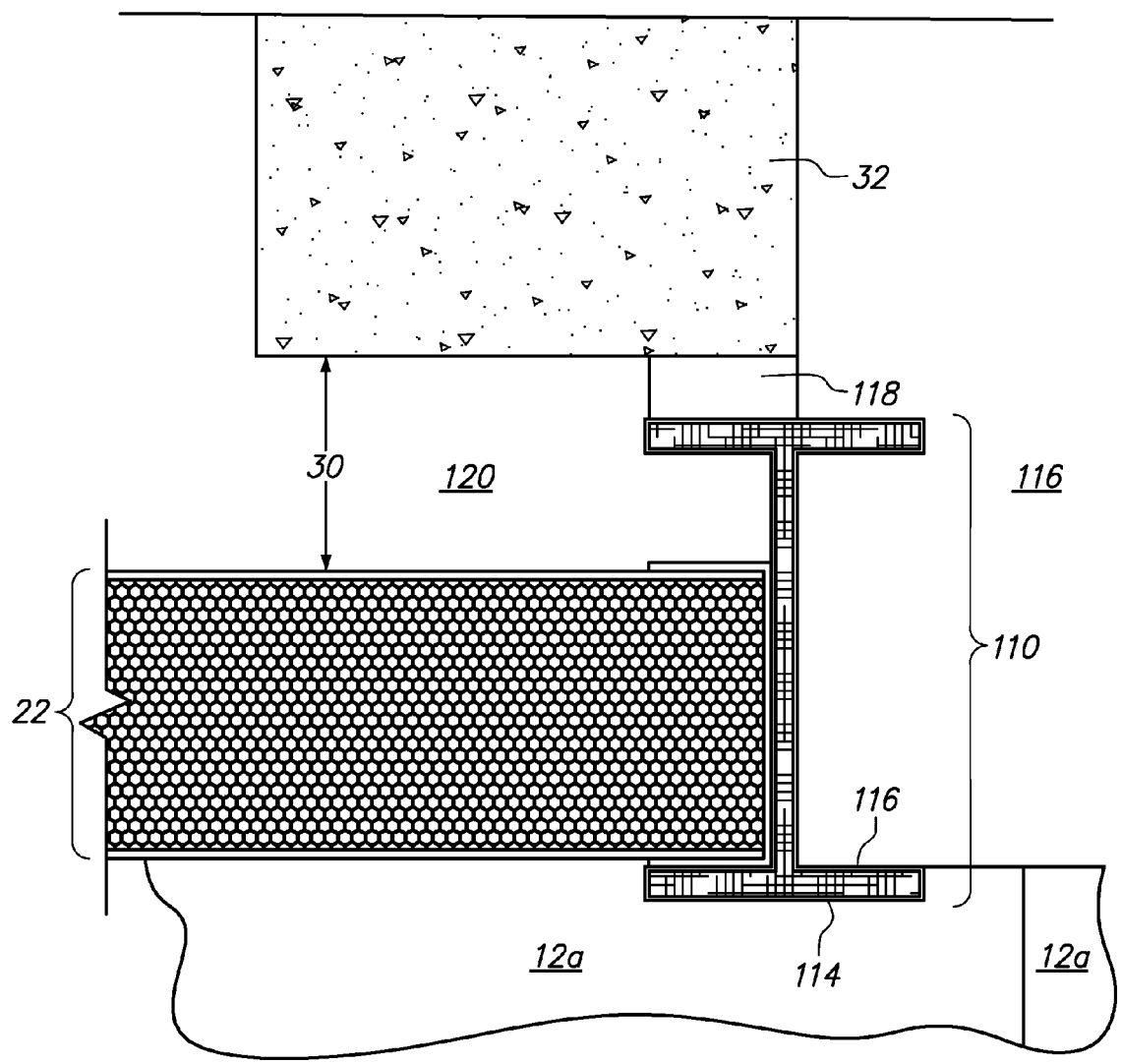
FIG. 20 is a cross sectional view of the underground vault shown in FIG. 5 illustrating a ceiling panel.
Figure 21:
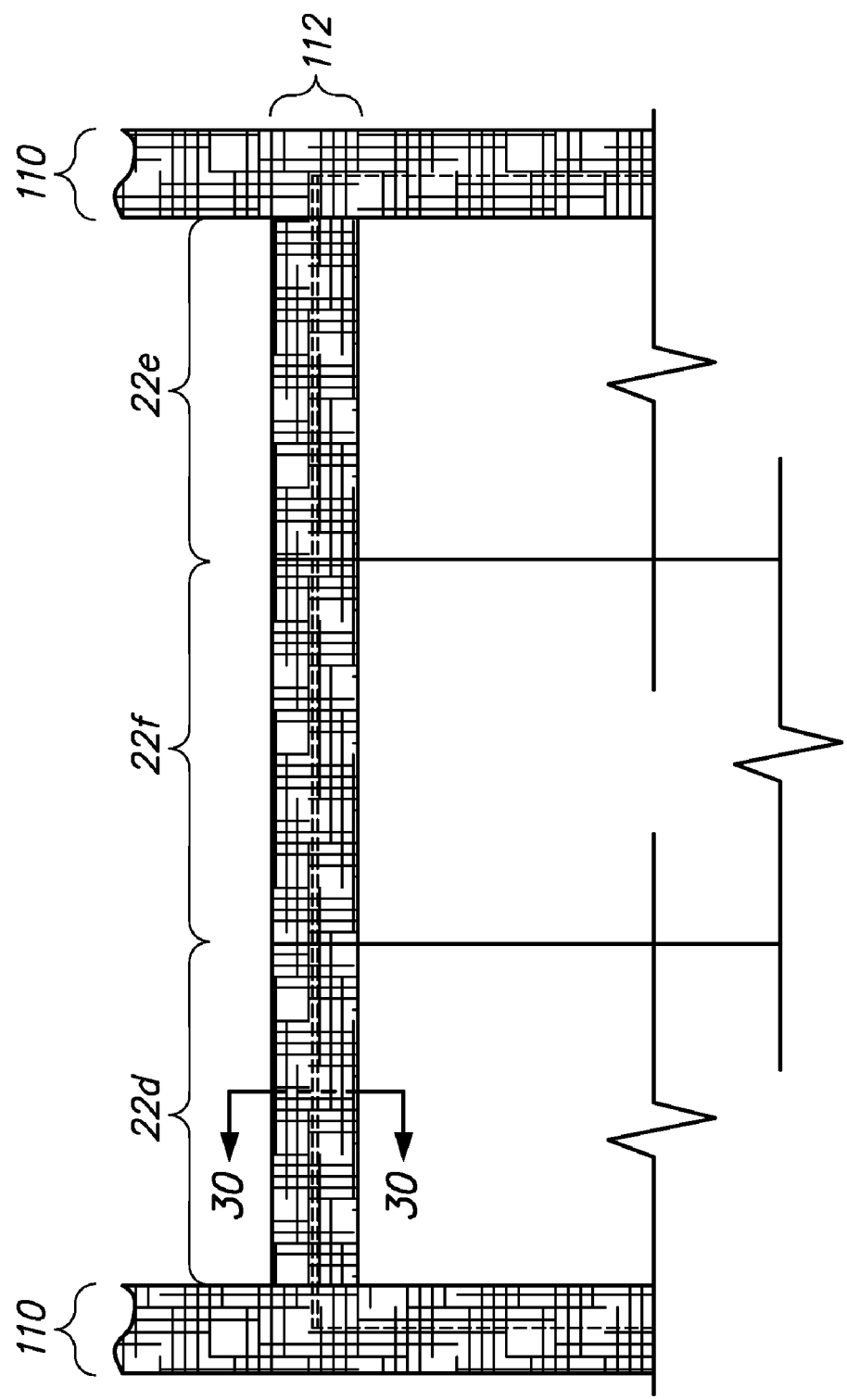
FIG. 21 is an enlarged view of ceiling panels resting on carry beams and cross carry beams shown in FIG. 5.

The carry beams 110 may be laid on top of the walls 106, 108 of wall panels 12. In particular, one of the wall panels 12 of the wall 108 may have a notch 114 (see FIG. 18). The notch 114 may receive a flange 116 of the carry beam 110, as shown in FIG. 20. The carry beam 110 rests upon the wall panel 12a of the wall 108. The carry beam 110 may also rest within a notch 114 formed within one of the wall panels 12 of the wall 106. Two (2) carry members 110 are laid upon the walls 106, 108 of wall panels 12 as shown in FIG. 5. The carry members 110 mark out the perimeter of the manhole 20. No ceiling panels 22 are placed on the manhole side 116 to allow clearance or passageway from the manhole 20 to inside of the replacement underground vault. A filler block 118 (see FIG. 20) may be disposed between the carry beam 110 and ceiling 32 of the underground vault 18. A filler 120 may be disposed within the gap 30 between the ceiling panel 22 and ceiling 32. The cross carry beam 112 extends between the carry beams 110. The cross carry beam 112 is attached to the carry beams 110 by way of epoxy, adhesive or the like.

Figure 22:
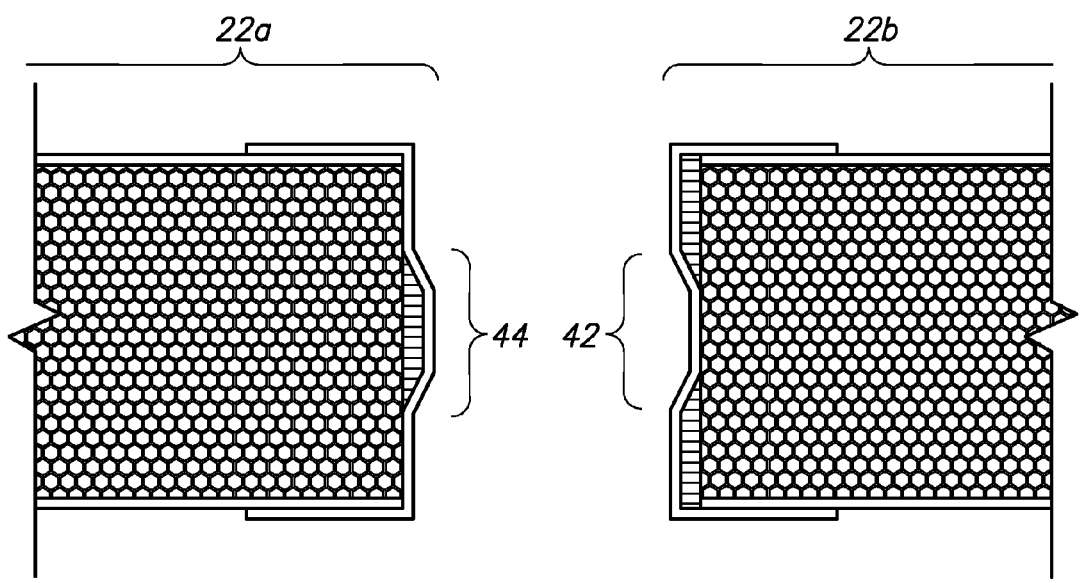
FIG. 22 is a cross sectional view of adjacent ceiling panels as shown in FIG. 5 having a tongue and groove connection.
Figure 23:
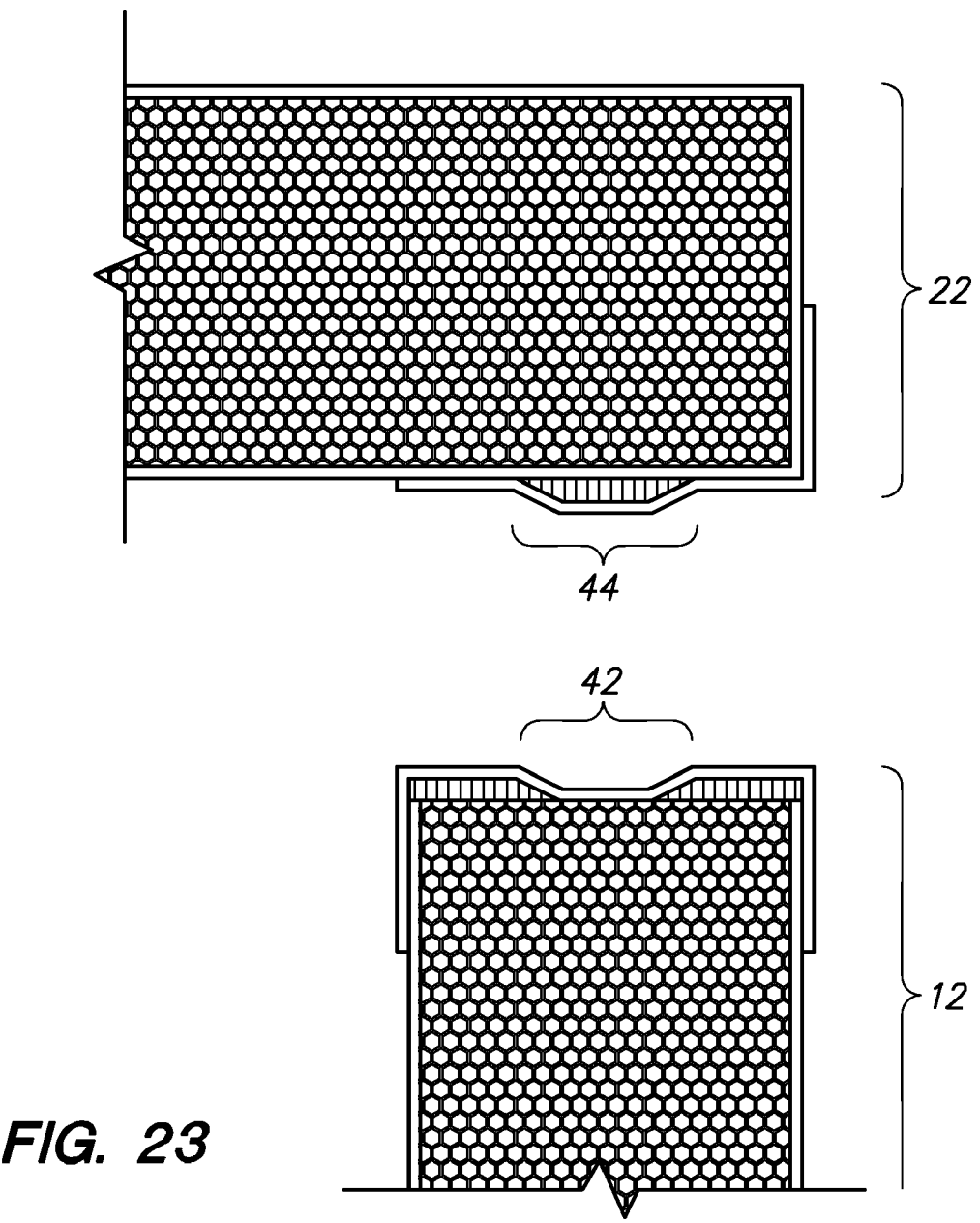
FIG. 23 is a cross sectional view illustrating a tongue and groove connection between a ceiling panel and a wall panel shown in FIG. 5.

Once the carry beams 110, 112 are in place, the ceiling panels 22 may be laid on top of the wall panels 12. The ceiling panels 22 are interlocked to each other by tongue and groove connection 44, 42, as shown in FIGS. 5 and 22. Additionally, the ceiling panels 22 may be attached to the wall panels 12 also by a tongue and groove connection 44, 42, as shown in FIG. 23. The tongue and groove 44, 42 of the ceiling panels 22 may be fabricated in the same manner that the tongue and grooves 44, 42 are fabricated for the wall panel 12, as discussed above.

Referring now to FIGS. 24-29A, ceiling panels 22a-e are shown. The ceiling panel 22 may be formed with tongues 44 on the periphery thereof (see FIGS. 24-29A). The tongues 44 are received into the grooves 42 of a respective ceiling panel 22 as shown in FIGS. 5 and 22. For example, as shown in FIG. 22, the right edge of the ceiling panel 22a is formed with a tongue 44 which is received into a corresponding groove 44 of the adjacent ceiling panel 22 which in this case is ceiling panel 22b. (see FIGS. 5 and 22). The lower surface of the ceiling panel 22 has a tongue 44 formed on its lower surface that is received into corresponding grooves on the upper edge of the corresponding wall panel 12 as shown in FIG. 23. The left edge of the ceiling panel 22c may engage the ceiling panel 22b. The right edge of the ceiling panel 22c may be flat as shown in FIG. 26A. The ceiling panel 22c may rest on the opposing wall panels 12 but also on a flange 122 of the carry beam 110, as shown in FIGS. 26A and 20. The ceiling panels 22a, b, c may also be installed on the other side in the same manner but may have a mirror configuration.

Referring now to FIGS. 27-29A, the ceiling panel 22d, e may be formed in left and right configurations (see FIGS. 27 and 29). The ceiling panel 22b may be placed on the carry beams 110, 112 as shown in FIGS. 5, 21, 30 and 31. A minor version of the ceiling panel 22d (i.e., 22e) may be placed on the other side on the carry beams 110, 112. The ceiling panel 22d is supported on the flange 122 of the carry beam 110, as shown in FIG. 30. The ceiling panel 22e is also supported by the cross carry beam 112. The ceiling panel 22f is disposed between the ceiling panel 22d and 22e with a tongue and groove connection 44, 42. The ceiling panel 22f also is supported by flange of cross carry beam 112 and the wall 106.

As discussed herein, the various components of the system 10 may be brought in through the existing manhole. However, in certain instances, it may be difficult to bring the various components of the system 10 into the deteriorating vault through the existing manhole. One reason may be that the existing components within the existing vault may block the manhole 20 so that the elongate wall panel or ceiling panel cannot be brought into the deteriorating vault. Another reason is that the wall panels and ceiling panels may have to be made wider than the existing manhole so that the wall panels and ceiling panels cannot be slipped into the deteriorating underground vault through the existing manhole. In this instance, the existing manhole may have to be opened up to allow the ceiling panels and wall panels to be inserted into the existing vault. Fortunately, such destruction of the manhole 20 may be minor and does not significantly disrupt traffic and electrical supply to residents of the local city. In certain circumstances, it is also contemplated that the portion of or the entire ceiling must be removed to install the replacement vault described herein. Nonetheless, the disruption may be minimal to pedestrians, vehicles, city and other public uses. The deteriorating underground vault does not need to be excavated to install the replacement underground vault.

The wall panels and ceiling panels are attached to each other through a unique tongue and groove connection. However, it is also contemplated that the other attachment means are also contemplated that are known in the art or developed in the future.

The wall panels and ceiling panels are described as having an aluminum honeycomb core. However, other materials and structure are also contemplated so long as the wall and ceiling panels are sufficiently strong to support the required weight and light enough so that personnel can manipulate the wall and ceiling panels to assemble these parts within the existing underground vault.

The above description is given by way of example, and not limitation. Given the above disclosure, one skilled in the art could devise variations that are within the scope and spirit of the invention disclosed herein, including various ways of forming the tongues and grooves. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of replacing a deteriorating vault, the method comprising the steps of:
   a) obtaining information regarding an existing entry of the deteriorating vault;
   b) forming a plurality of interlockable structural wall panels and structural ceiling panels, the structural wall panels and structural ceiling panels being sufficiently narrow to permit entry of the structural wall panels and structural ceiling panels through an existing entry of the deteriorating vault;

c) inserting the formed structural wall panels and the structural or ceiling panels into the deteriorating vault through the existing entry of the deteriorating vault;

d) securing the inserted structural wall panels to a floor of the deteriorating vault;

e) securing the ceiling panels to the wall panels secured to the floor of the deteriorating vault;

f) repeating steps c) and d) until all of the structural wall and ceiling panels are in place within the deteriorating vault.

2. The method of claim 1 further comprising the step of:
filling a gap between a wall of the deteriorating vault and the wall panels and between a ceiling of the deteriorating vault and the ceiling panels with a material to prevent the deteriorating vault from falling down on the wall and ceiling panels.

3. The method of claim 1 wherein the securing the wall panels step includes the step of securing the wall panels sequentially an that the subsequent wall panel secured to the door is immediately adjacent to previously secured wall panels.

4. The method of claim 1 further comprising the step of disposing the wall panels gapped away from the wall of the deteriorating vault for subsequent filling with material.

5. The method of claim 1 wherein the existing entry of the deteriorating vault is a manhole or a neck.

6. A vault replacement system, the system comprising:
a deteriorating vault having a utility pipe protruding through a vault wall of the deteriorating vault;

a plurality of interlocking wall panels for forming an enclosed wall within the deteriorating vault, at least one of the wall panels having upper and lower wall panel sections, a lower end of the upper wall panel section having a first cutout for receiving the utility pipe, an upper end of a lower wall panel section having a, second cutout for receiving the utility pipe wherein the first and second cutouts of the upper and lower wall panel sections form an aperture through which the utility pipe is received;

a filler material disposable between, the utility pipe and the first and second cutouts of the upper and lower wall panel sections;

a plurality of interlocking ceiling panels interlockable to an upper portion of the plurality of interlocking wall panels;

wherein each of the interlocking wall and ceiling panels are narrower compared to a neck of the deteriorating vault so as to be capable of being brought through the neck and into the deteriorating vault for subsequent assembly.

* * * * *